Dec. 2, 1930.    H. FORD    1,783,501
AUTOMOBILE VENTILATING CONSTRUCTION
Filed Nov. 26, 1928

INVENTOR.
Henry Ford.
BY C. R. Halbert.
E. L. Davis.
ATTORNEYS.

Patented Dec. 2, 1930

1,783,501

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

AUTOMOBILE VENTILATING CONSTRUCTION

Application filed November 26, 1928. Serial No. 321,796.

The object of my invention is to provide an automobile ventilating construction of simple, durable and inexpensive construction.

Still a further object of my invention is to provide an automobile ventilating construction, which will at all times be concealed from the occupants of the car.

Still a further object of my invention is to provide an automobile ventilating construction which will direct the incoming air downwardly and to the front of the interior of the car to secure a well ventilated driving compartment. In this connection it may be well to point out that the dash and the floor boards of an automobile become excessively hot during summer driving by reason of the heated air from the radiator being blown directly on these parts. Numerous devices have been made to absorb this excess heat by directing a stream of incoming air upon the heated parts but these devices are either unsightly or their cost prohibits them from being installed on a low priced automobile.

Still a further object of my invention is to provide an automobile ventilating construction which will direct the incoming air downwardly and to the front of the automobile, and which will be entirely independent of the cowl associated with said automobile. In a well-known make of automobile the gasoline tank is built in a unit with the cowl of the car and consequently, on this make of car, it is impossible to install, in the top of the cowl, the conventional type of air scoop. However, if the air scoop is placed in either side of the cowl member, some of the heated air escapes from the engine compartment through the louvers in the side of the hood and enters the air scoop which must necessarily be directly in its path. This heated air which thereby enters the car is of course not as good as unheated air so the air scoop placed in the side of the cowl is not thoroughly efficient. It can therefore be seen that in connection with cars having a unit gasoline tank and cowl member some form of ventilating device other than the air scoop is advantageous. It is in this type of car that my invention finds its greatest utility, however, due to its negligible cost it can be advantageously applied to all types of car bodies.

Still a further object of my invention is to provide an automobile ventilating construction which will direct the incoming air downwardly and to the front of the car and which will at the same time exclude rain from entering the driving compartment at all times, either when the ventilating device is in operation or when it is closed. To my knowledge all of the types of car ventilators now produced allow rain to enter with the incoming air and therefore are not used during rainy weather. This is a serious defect because the windows of the car must naturally be closed and the comfort of the occupants depends upon the air entering through the ventilator.

Still a further object of my invention is to make an automobile ventilating construction which does not add materially to the cost of the car.

With these and other objects in view my invention consists in the arrangement, construction and combination of the various parts of my improved device, as described in the specification, claimed in the claims, and illustrated in the accompanying drawings, in which:

Figure 1:
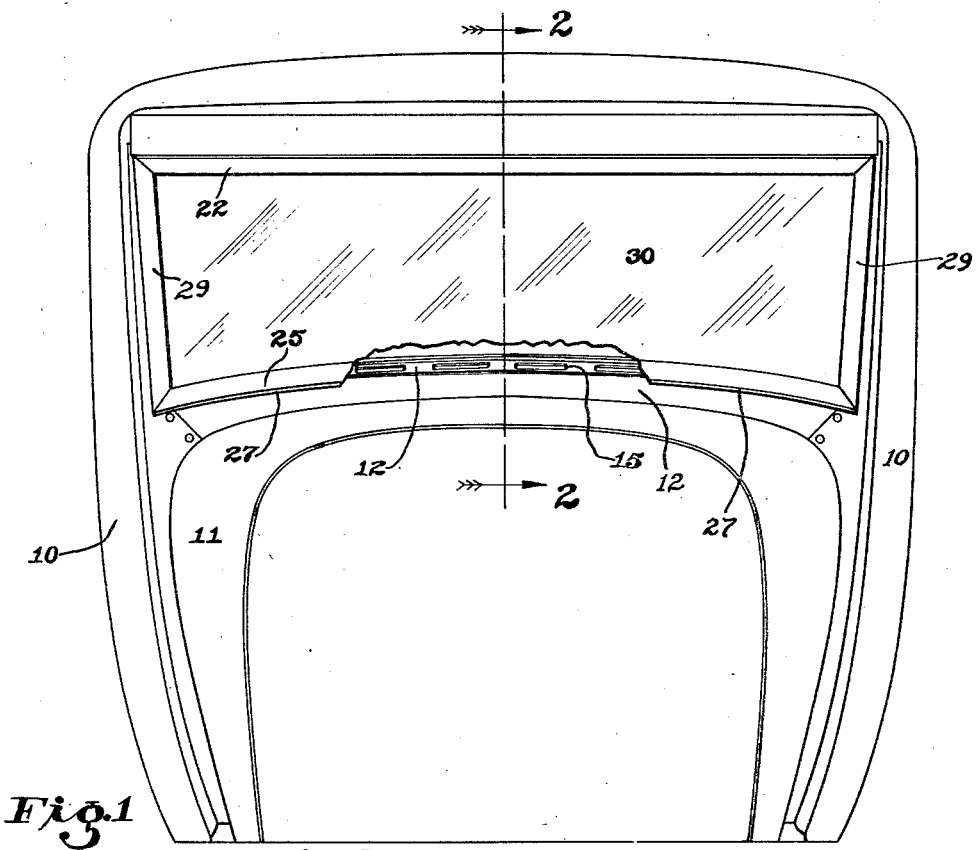
Figure 1 shows a plan view of an automobile, looking from the cowl toward the rear, parts of the windshield being broken away to better illustrate the construction.

Referring to the accompanying drawings, I have used the reference numeral 10 to indicate generally the body of an automobile having a cowl 11 secured to the forward end thereof. No further description of these parts will be given as my improved construction applies to all types of automobile bodies having cowl members associated therewith.

Figure 3:
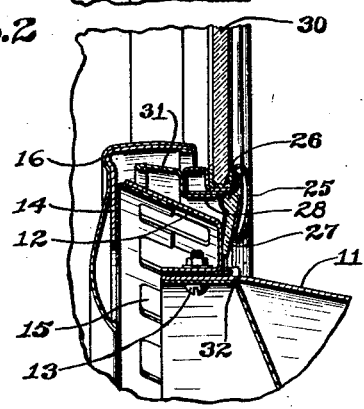
Figure 3 shows a section similar to Figure 2 having the windshield partly open to illustrate the path of the air through my improved ventilating device.
Figure 3:
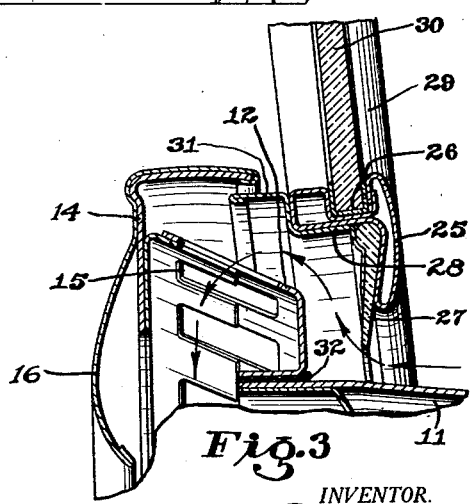

A channel shaped transverse windshield stop 12 is secured to the top of the rear edge of the cowl 11 by bolts 13. This stop member has a substantially horizontal securing flange, a vertical flange forming the stop proper, a rearwardly and upwardly extending flange having a plurality of rectangular slots 15 punched therein, and a second vertically extending flange which supports the angle section. This stop 12 is formed from two sections, as shown in the drawings, and spot welded together thereby eliminating the very difficult forming operations necessary if the same were made in one piece. An angle section air deflecting and garnish member 14 is secured to the rear edge of the stop 12 by welding or by riveting. To the rear surface of the angle 14 is secured an angle-section garnish member 16. The lower edge of this strip 16 is curved as shown in Figure 3 to aid the member 14 in deflecting the air entering slots 15 downwardly and to the front of the cowl.

A transverse upper windshield supporting header 18 is disposed at the top of the body 10. One of the wings 19 of the windshield hinge is secured to this member 18 by bolts 20. The rear edge of wing 19 is shaped so as to hide from view the hinge part of the windshield and an upholstered garnish strip 21 is suitably secured to wing 19 to carry the interior finish of the car down to the transparent part of the windshield.

It will be noted that the wing 19 of the windshield hinge which is secured to the header strip by the bolt 20, is bent downwardly to conceal the hinge and the top of windshield frame as at 33. The lower edge of this flange 33 is bent upon itself to form a rearwardly and upwardly opening channel 34. The garnish strip 21 is formed by covering a board panel with upholstery fabric so that the lower edge of this garnish strip may rest in this channel 34 and the latter may both support the garnish strip and also form a finish for the lower edge thereof.

The upper transverse windshield frame member 22 is formed with a glass groove 23 on its lower side, its upper edge 24 being curled to form the other half of the windshield hinge. This type of windshield hinge, although of recent design, is now in common use and so no further description will be given regarding it as any type of swinging windshield hinge may be used with my device.

The lower transverse windshield frame member 25 is formed with a glass groove 26 in its upper surface, its lower edge terminating with a rubber weather strip 27. An elongated deflecting strip 28 is secured to and projects rearwardly from the frame member 25 and forms the rear support for weather strip 27. Grooved vertical members 29 complete the rectangular windshield frame into which glass 30 is secured.

It is thus evident that the structure constituting my present invention is strong and light and as no part not ordinarily used in connection with a cowl and windshield construction is used, the cost of producing this construction is negligible.

Figure 2:
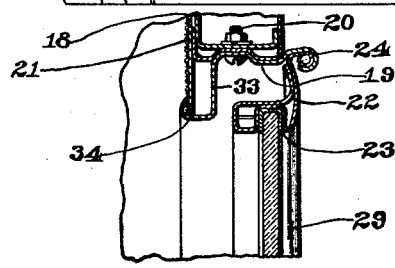
Figure 2 shows a section taken on line 2—2 of Figure 1.

As may be seen from Figure 2, when the windshield is in the closed position the weather strip 27 effectively stops all rain and air from entering the body. When the windshield is partially open, as shown in Figure 3, the incoming air is allowed to go under the weather strip and is then deflected upwardly by base 12 and then downwardly through the slots 15. The lower front surface of garnish strip 16 directs the air forwardly to the dash member of the car. As can be seen, no draft is produced in the upper part of the car when the windshield is only partially open. The windshield may of course be fully open if a strong flow of air is desired in the car.

Rain does not enter the slots 15 by reason of the fact that all the rain passing under the weather strip 27 is stopped by the forward vertical or stop wall of base 12 and flows off the edge of the cowl. As will be seen the slots 15 are considerably above the forward wall which effectively prevents the water from entering them.

It will be noted that there is a flange 31 which extends rearwardly from the lower windshield frame 25, this flange 31 extending horizontally rearwardly from such frame member. When the windshield is closed and the rubber 27 bears against the forward wall of the channel 12, then the flange 31 sets between the horizontal portion of the angle 14 and the rearwardly extending or slotted portion of the member 12. When, however, the windshield is swung to the ventilating position, illustrated in Figure 3, the flange 31 extends to position so that its edge is adjacent to the forward edge of the horizontal portion of the member 14 and a pocket is thereby formed by the windshield rubber 27, the flange 31, the member 14 and the member 12 which extends across the car. Air may enter this pocket through the relatively restricted opening below the windshield rubber 27 but can only leave this pocket through the still more restricted area of the openings or slots through the member 12. It will thus be seen that the velocity of any air passing under the rubber 27 will be reduced as soon as it passes beneath the rubber whereby moisture therein will tend to precipitate out on the cowl 11 and run down off the outside of the car, while the air alone flows down through the slots in the member 12 and into the compartment within the cowl at the forward end of the car.

The base member 12 is set on a gasket or insulation strip 32 which has the double function of preventing any body squeaks at this point and of preventing the entrance of water or air through the body at this point.

Among the many advantages arising from the use of my improved ventilating construction, it should be pointed out first that the cost of the automobile is unaffected by the use of my device. In the next place a well distributed and directed air stream is obtained on the dash and floor boards of the car. Still a further advantage results when used with those cars having a unit cowl and gasoline tank by reason of my improved construction being entirely independent of the cowl of the automobile.

A further advantage results from the use of my improved construction in that the rain is effectively prevented from entering the body with the incoming air.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In a device of the character described, a cowl member, a windshield hinged thereabove, a vertical stop member for said windshield mounted on said cowl adjacent to the rear edge thereof, an angle section member mounted on said cowl in position spaced rearwardly from said stop member and with one flange thereof in a substantially horizontal position and the other flange in a substantially vertical position whereby said angle member may serve as a combined garnish and deflecting strip, and a flange extended rearwardly from the lower edge of said windshield, said flange being so shaped and disposed that it may nest between said stop and said angle strip when the windshield is closed and so that it may serve as a continuation of the garnish strip for the lower edge of the windshield when the latter is slightly opened.

2. In an automobile body ventilating construction, a cowl, a member of angular section secured thereto adjacent to the rear edge thereof, said member having a substantially horizontal flange adapted to be secured to said cowl and a vertical flange extending therefrom adapted to form a stop for a windshield and a rearwardly extending flange adjacent to said stop portion having a plurality of openings therethrough and a vertically extending flange in the rear of said rearwardly extending portion, a second member of angular section mounted on said last described flange of the first described member, said second member having a substantially horizontal flange adapted to form a garnish for the windshield and a substantially vertical flange adapted to form a deflecting plate to direct air down into the compartment below the cowl.

3. In a device of the character described, a cowl member, a windshield pivoted to swing above said cowl member with its lower edge spaced therefrom, a vertical stop member mounted on said cowl against which said windshield co-acts when in its closed position, a deflecting strip secured to said cowl member having a horizontal portion disposed above the stop member, and a horizontal flange secured to said windshield so that it may nest between said stop and the horizontal portion of said deflecting strip when the windshield is closed and so that it may serve as a continuation of said strip when the windshield is slightly opened.

4. In a device of the character described, a cowl member, an outwardly opening windshield pivoted to swing above said cowl with its lower edge spaced therefrom, a vertical stop member mounted on said cowl against which said windshield co-acts when in its closed position, a deflecting strip spaced rearwardly from said cowl having a horizontal portion disposed above the stop member, and a horizontal flange secured to the windshield so that it may nest between said stop member and the horizontal portion of said deflecting strip when the windshield is closed and so that it may serve as a continuation of said strip when the windshield is slightly opened.

5. In a device of the character described, a cowl member, an outwardly opening windshield pivoted to swing above said cowl member with its lower edge spaced therefrom, a vertical stop member mounted on said cowl against which said windshield co-acts when in its closed position, a deflecting strip spaced rearwardly from said cowl having a forwardly extending horizontal portion disposed above the stop member, and a rearwardly extending horizontal flange secured to the windshield so that it may nest between said stop and the horizontal portion of said deflecting strip when the windshield is closed and so that it may serve as a continuation of said strip when the windshield is slightly opened.

6. In a device of the character described, a cowl member, a windshield pivoted to swing above said cowl member, a stop member associated with said cowl against which said windshield co-acts when in its closed position, a strip arranged to deflect downwardly air entering between said stop and windshield, and telescopic members associated with said deflecting strip and windshield in position so that when the windshield is slightly opened a substantial seal will be maintained between the upper portion of the deflecting strip and the windshield for the purpose described.

7. In a device of the character described, a cowl member, an outwardly opening windshield pivoted to swing above said cowl member with its lower edge spaced therefrom, a stop member associated with said cowl member against which said windshield co-acts when in its closed position, a deflecting strip spaced rearwardly from said stop member, and telescopic members associated with said deflecting strip and windshield in position so that when the windshield is slightly opened a substantial seal will be maintained between the upper portion of the deflecting strip and the windshield to thereby downwardly deflect the air entering between said stop member and the windshield.

October 26, 1928.

HENRY FORD.